(12) United States Patent
Kwant et al.

(10) Patent No.: US 10,339,669 B2
(45) Date of Patent: Jul. 2, 2019

(54) METHOD, APPARATUS, AND SYSTEM FOR A VERTEX-BASED EVALUATION OF POLYGON SIMILARITY

(71) Applicant: HERE GLOBAL B.V., Eindhoven (NL)

(72) Inventors: Richard Kwant, Oakland, CA (US); Anish Mittal, Berkeley, CA (US); David Lawlor, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 35 days.

(21) Appl. No.: 15/683,367

(22) Filed: Aug. 22, 2017

(65) Prior Publication Data

US 2019/0066328 A1 Feb. 28, 2019

(51) Int. Cl.
*G06T 7/70* (2017.01)
*G06T 7/73* (2017.01)
(Continued)

(52) U.S. Cl.
CPC .............. *G06T 7/74* (2017.01); *G06K 9/00228* (2013.01); *G06K 9/00791* (2013.01);
(Continued)

(58) Field of Classification Search
CPC .............. G06T 7/74; G06T 2207/10028; G06T 2207/30236; G06T 2207/30232;
(Continued)

(56) References Cited

U.S. PATENT DOCUMENTS 5,982,909 A * 11/1999 Erdem .................... G06T 7/251
348/169
6,542,151 B1 * 4/2003 Minami .................. G06T 15/02
345/419

(Continued)

FOREIGN PATENT DOCUMENTS

KR 20110050759 * 5/2011

OTHER PUBLICATIONS

Efrat et al. "New Similarity Measures between Polylines with Applications to Morphing and Polygon Sweeping", Discrete Comput Geom OF1-OF35 (2002), DOI: 10.1007/s00454-002-2886-1 (Year: 2002).*

(Continued)

*Primary Examiner* — Qian Yang
(74) *Attorney, Agent, or Firm* — Ditthavong & Steiner, P.C.

(57) ABSTRACT

An approach is provided for a vertex-based evaluation of polygon similarity. The approach, for instance, involves processing, by a computer vision system, an image to generate a first set of vertices of a first polygon representing an object depicted in the image. The approach also involves for each vertex in the first set of vertices, determining a closest vertex in a second set of vertices of a second polygon, and determining a distance between said each vertex in the first set of vertices and the closest vertex in the second set of vertices. The approach further involves calculating a polygon similarity of the first polygon with respect to the second polygon based on a total of the distance (Continued)

determined for said each vertex in the first set of vertices normalized to a number of vertices in the first set of vertices.

20 Claims, 15 Drawing Sheets

(51) Int. Cl.
*G06K 9/00* (2006.01)
*G06K 9/62* (2006.01)

(52) U.S. Cl.
CPC ....... *G06K 9/00979* (2013.01); *G06K 9/6215* (2013.01); *G06T 2207/10028* (2013.01); *G06T 2207/30232* (2013.01); *G06T 2207/30236* (2013.01)

(58) Field of Classification Search
CPC ........... G06K 9/00228; G06K 9/00979; G06K 9/6215; G06K 9/00791
See application file for complete search history.

(56) References Cited

U.S. PATENT DOCUMENTS

| | | | |
|---|---|---|---|
| 6,856,312 B1* | 2/2005 | Imai | G06T 17/30 345/419 |
| 8,614,703 B1* | 12/2013 | Fong | G01C 21/32 345/418 |
| 2007/0286493 A1 | 12/2007 | Liu et al. | |
| 2008/0021882 A1* | 1/2008 | Pu | G06F 17/30247 |
| 2009/0252373 A1* | 10/2009 | Paglieroni | G06K 9/00637 382/103 |
| 2016/0012638 A1* | 1/2016 | Skrobanski | G06T 17/00 345/420 |
| 2017/0083762 A1 | 3/2017 | Segalovitz et al. | |
| 2017/0084030 A1 | 3/2017 | Coradi et al. | |

OTHER PUBLICATIONS

Amato, "Finding a Closest Visible Vertex Pair Between Two Polygons", Algorithmica, Aug. 1995, vol. 14, Issue 2, pp. 183-201 (Year: 1995).*

Felzenszwalb, "Representation and detection of shapes in images", IEEE Transactions on Pattern Analysis and Machine Intelligence, vol. 27, No. 2, Feb. 2005 (Year: 2005).*

Avbelj et al., "A Metric for Polygon Comparison and Building Extraction Evaluation", IEEE Geoscience and Remote Sensing Letters, vol. 12, No. 1, Jan. 2015, 5 Pages.

Griffin et al., "An Active Mesh Based Tracker for Feature Correspondences", 10th European Signal Processing Conference, IEEE, Sep. 4-8, 2000, 4 Pages.

Wikipedia, "Jaccard Index", Last edited on May 22, 2017, retrieved from https://en.wikipedia.org/wiki/Jaccard_index, 4 Pages.

Wikipedia, "Earth Mover's Distance", Last edited on Apr. 7, 2017, retrieved from https://en.wikipedia.org/wiki/Earth_mover's_distance, 3 Pages.

Arkin et al., "An Efficiently Computable Metric for Comparing Polygonal Shapes", IEEE Transactions on Pattern Analysis and Machine Intelligence, vol. 13, No. 3, Mar. 1991, pp. 209-216.

Veltkamp, "Shape Matching: Similarity Measures and Algorithms", SMI 2001 International Conference on Shape Modeling and Applications, IEEE, May 7-11, 2001, 10 Pages.

* cited by examiner

METHOD, APPARATUS, AND SYSTEM FOR A VERTEX-BASED EVALUATION OF POLYGON SIMILARITY

BACKGROUND

Object detection has recently seen a surge of intense research interest, driven by applications in diverse fields such as video surveillance, the internet of things (IoT), and autonomous driving. While the particulars of individual use-cases may differ significantly, the basic premise of object detection remains constant: given a raster image (or sequence of images), identify the pixels corresponding to a particular object of interest, and construct polygonal boundaries or polygons to represent the object of interest from the identified pixels. However, the question of evaluating the quality of the object detections (e.g., quality of the polygonal representations of the objects) continues to present technical challenges.

SOME EXAMPLE EMBODIMENTS

Therefore, there is a need for an approach for determining polygon similarity as an indicator of object detection quality for a computer vision system.

According to one embodiment, a computer-implemented method for evaluating polygon similarity using a computer vision system comprises processing, by the computer vision system, an image to generate a first set of vertices of a first polygon representing an object depicted in the image. The method also comprises for each vertex in the first set of vertices, determining a closest vertex in a second set of vertices of a second polygon, and determining a distance between said each vertex in the first set of vertices and the closest vertex in the second set of vertices. The method further comprises calculating a polygon similarity of the first polygon with respect to the second polygon based on a total of the distance determined for said each vertex in the first set of vertices normalized to a number of vertices in the first set of vertices.

According to another embodiment, an apparatus for evaluating polygon similarity using a computer vision system comprises at least one processor, and at least one memory including computer program code for one or more computer programs, the at least one memory and the computer program code configured to, with the at least one processor, cause, at least in part, the apparatus to process, by the computer vision system, an image to generate a first set of vertices of a first polygon representing an object depicted in the image. The apparatus is also caused to, for each vertex in the first set of vertices, determine a closest vertex in a second set of vertices of a second polygon, and determining a distance between said each vertex in the first set of vertices and the closest vertex in the second set of vertices. The apparatus is further caused to calculate a polygon similarity of the first polygon with respect to the second polygon based on a total of the distance determined for said each vertex in the first set of vertices normalized to a number of vertices in the first set of vertices.

According to another embodiment, a non-transitory computer-readable storage medium for evaluating polygon similarity using a computer vision system carries one or more sequences of one or more instructions which, when executed by one or more processors, cause, at least in part, an apparatus to process, by the computer vision system, an image to generate a first set of vertices of a first polygon representing an object depicted in the image. The apparatus is also caused to, for each vertex in the first set of vertices, determine a closest vertex in a second set of vertices of a second polygon, and determining a distance between said each vertex in the first set of vertices and the closest vertex in the second set of vertices. The apparatus is further caused to calculate a polygon similarity of the first polygon with respect to the second polygon based on a total of the distance determined for said each vertex in the first set of vertices normalized to a number of vertices in the first set of vertices.

According to another embodiment, an apparatus for evaluating polygon similarity using a computer vision system comprises means for processing, by the computer vision system, an image to generate a first set of vertices of a first polygon representing an object depicted in the image. The apparatus also comprises means for determining a closest vertex in a second set of vertices of a second polygon for each vertex in the first set of vertices, and means for determining a distance between said each vertex in the first set of vertices and the closest vertex in the second set of vertices. The apparatus further comprises means for calculating a polygon similarity of the first polygon with respect to the second polygon based on a total of the distance determined for said each vertex in the first set of vertices normalized to a number of vertices in the first set of vertices.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a vertex-based evaluation of polygon similarity are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
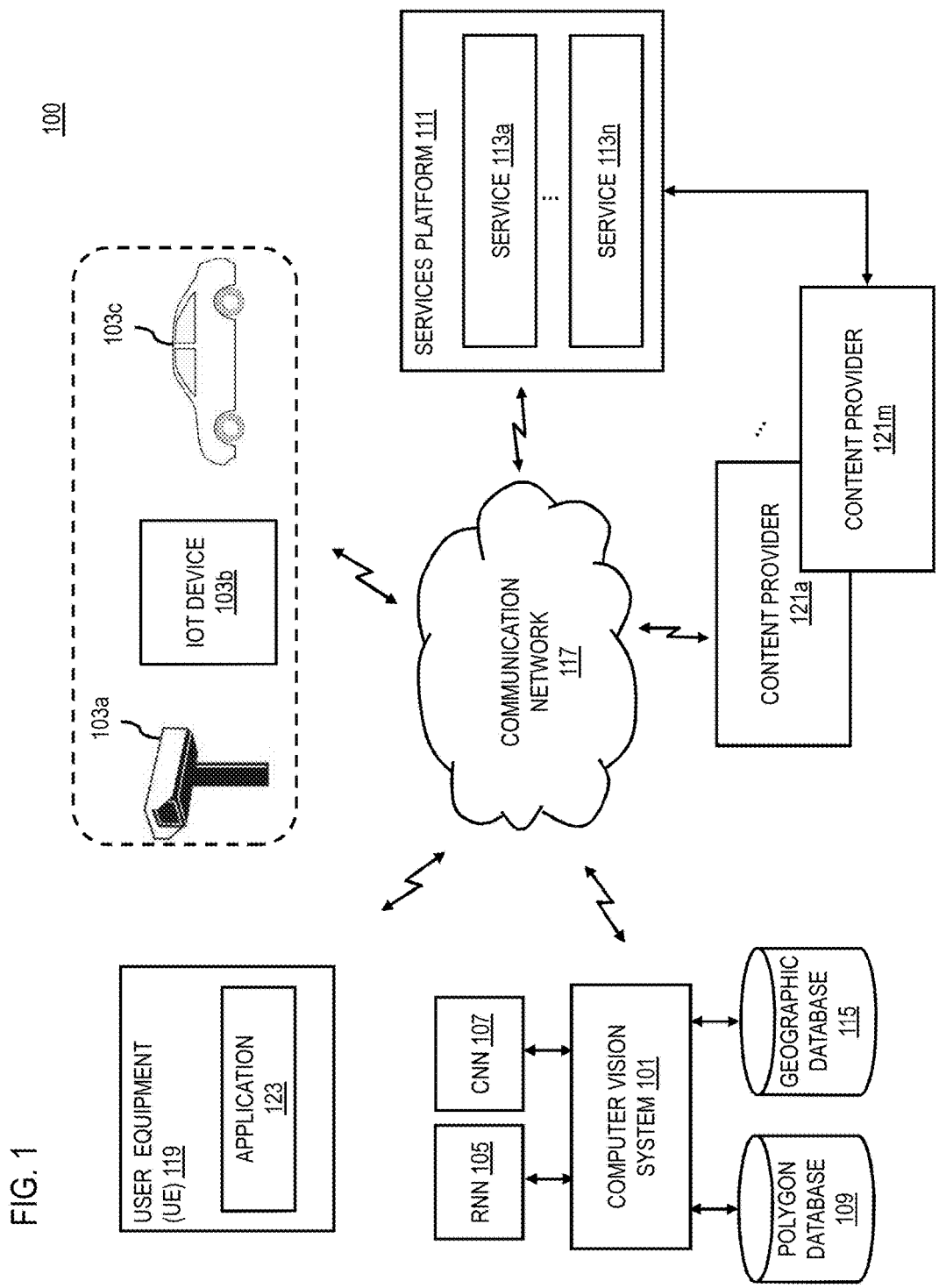
FIG. 1 is a diagram of a system capable of providing a vertex-based evaluation of polygon similarity, according to one embodiment.

FIG. 1 is a diagram of a system capable of providing a vertex-based evaluation of polygon similarity, according to one embodiment. As discussed above, object detection from image data (e.g., rasterized images or a sequence of images, such as a video, made from pixels) is spurring intense interest in the development of new and compelling use cases and/or services such as, but not limited to, video surveillance, the internet of things (IoT), autonomous driving, and/or the like. For example, in the case of video surveillance, the objects might be faces, people, or vehicles captured by a surveillance camera 103a; in IoT, they might include shipping containers, items cooking in an oven, and/or any other object of interest to an IoT device 103b; and for autonomous driving, they might include roadside signs, guardrails, or other vehicles captured by an autonomous vehicle 103c.

In one embodiment, objection detection refers to a process performed by a computer vision system 101 of capturing or otherwise obtaining an image (e.g., rasterized images or a sequence of images, such as a video, made from pixels) depicting an object of interest. The computer vision system 101 than uses any process known in the art to identify the pixels corresponding to the particular object of interest (e.g., machine learning processes using a recurrent neural network (RNN) 105, convolutional neural network (CNN) 107, or equivalent). The computer vision system 100 then uses axis-aligned bounding boxes or other polygonal boundaries to represent the shape of the identified pixels corresponding to the object of interest. Therefore, regardless of the use case (e.g., video surveillance, IoT, autonomous driving, etc.), a primary input for initiating respective services or functions of the use cases are the polygons generated by the computer vision system 101.

Accordingly, evaluating the quality of object detections is a significant technical challenge when using the computer vision system 101 for any of the use-cases mentioned above. For example, an evaluation method must meet the technical requirements of a desired behavior or function of the object detection system under a desired use case, and then choose an evaluation metric which encourages these desiderata to ensure that object detection performance meets the performance requirements of each use case. For example, in various embodiments, polygon similarity can be used to confirm a detected object and/or its identification, identify object movements, match detected objects to a library of objects (e.g., reference polygon objects stored in the polygon data 109), and/or any other function supported by an object detection use case, including those not specifically discussed herein.

In the field of object detection, one traditional metric for evaluating the similarity between two polygons is known as Intersection-over-Union (IoU) or the Jaccard Index. In this metric, the area of the intersection of two polygons is divided by the area of their union to indicate how similar the two polygons are. For example, two polygons which are completely disjointed would have IoU equal to zero, while two co-incident polygons would have IoU equal to one. Typically, a threshold is set (e.g., 0.5) below which the two polygons are said to be dissimilar; otherwise the polygons are said to be similar. This metric is useful in a number of contexts, in particular where the scale of the objects under consideration is accurately reflected by their areas.

Other metrics that have been used to evaluate similarity of polygons include: earth-mover distance (EMD), turning angle distance, and symmetric difference over union. These alternative metrics emphasize different notions of similarity, such as similarity in shape vs. similarity in position. However, these approaches tend share a common feature: polygon size affects the scale at which the metric is sensitive. For example, consider the IoU approach described above. A 10 pixel by 10 pixel square that is predicted to be 1 pixel to the right is penalized more than a 100 pixel by 100 pixel square that is predicted to be 1 pixel to the right. This occurs because the metric is normalized by the polygon area. While this behavior makes sense for generic object detection, it is not ideal in all circumstances. For example, algorithms that localize a camera pose based on the locations of detected polygons are sensitive to the absolute error in the polygon location. In cases such as these, it is important to judge the quality of predictions on a scale that is more absolute to improve the technical performance and efficiency of the computer vision system 101.

To address this problem, the system 100 introduces a computer vision system 101 that uses a polygon similarity metric which is sensitive to the location of the vertices of polygonal features (e.g., vertices of two-dimensional polygons, three-dimensional polygons, or higher N-dimensional polygons recognized from an input image). Vertices of objects can be a key factor in many object detection tasks, as they make excellent features for matching objects across frames. While the standard IoU metric is also sensitive to vertex locations, it is normalized by an area term which has the effect of dampening this sensitivity for large objects. This behavior can undesirable when small deviations in the vertex locations of large polygons are informative, such as in vehicle localization contexts. The various embodiments described herein overcome this technical limitation of the traditional approach by normalizing the polygon similarity metric by the number of vertices of the polygon, which scales at a much lower rate as the size of the polygon increases. In this way, the computer vision system 101 employing the vertex-based polygon similarity metric generated according to the various embodiments described herein can advantageously improve its technical capabilities by increasing the sensitivity of the computer vision system 101 to vertex differences between two polygons. In the instant description, the vertex-based polygon similarity metric is also referred as a "corner metric" or "CM" in reference to a vertex representing a corner of a polygon.

In addition, the embodiments of polygon similarity determined according to the various embodiments described herein are asymmetric, meaning that the vertex-based polygon similarity of a first polygon to a second polygon is not generally equal to the vertex-based polygon similarity of the second polygon to the first polygon. The asymmetry of the embodiments of vertex-based polygon similarity described herein is distinct from other traditional evaluation metrics, and results in a technical improvement of the computer vision system 101 by enabling a finer measure of granularity in the polygon similarity evaluation process. In use cases where asymmetry is not needed or used, the computer vision system 101 can report either of the asymmetric values as individual values, or combine the asymmetric value into a single symmetric value, for instance, by averaging the asymmetric values or performing another equivalent operation.

It is further noted that the embodiments described herein treat polygons as zero-dimensional objects; that is, they are described by their vertices. In contrast, the traditional IoU treats polygons as two-dimensional objects described by their areas. For use cases, in which the vertices of the detected objects are of more importance, the embodiments of polygon similarity described herein represent a more faithful measure of the quality of detected objects.

Figure 2:
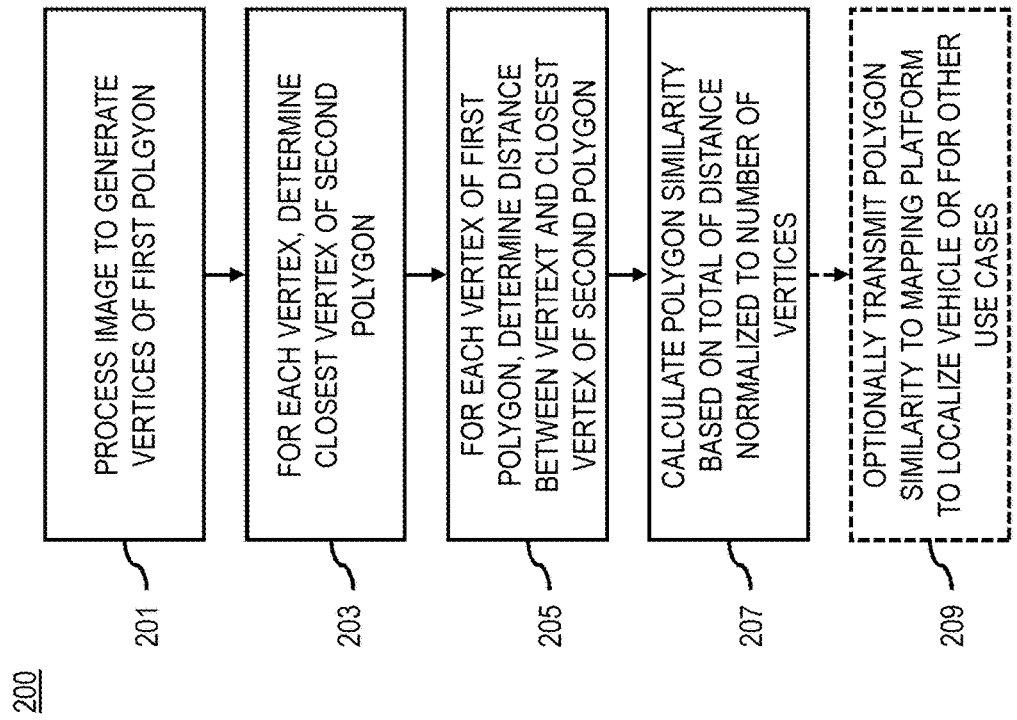
FIG. 2 is a flowchart of a process for providing a vertex-based evaluation of polygon similarity, according to one embodiment.
Figure 10:
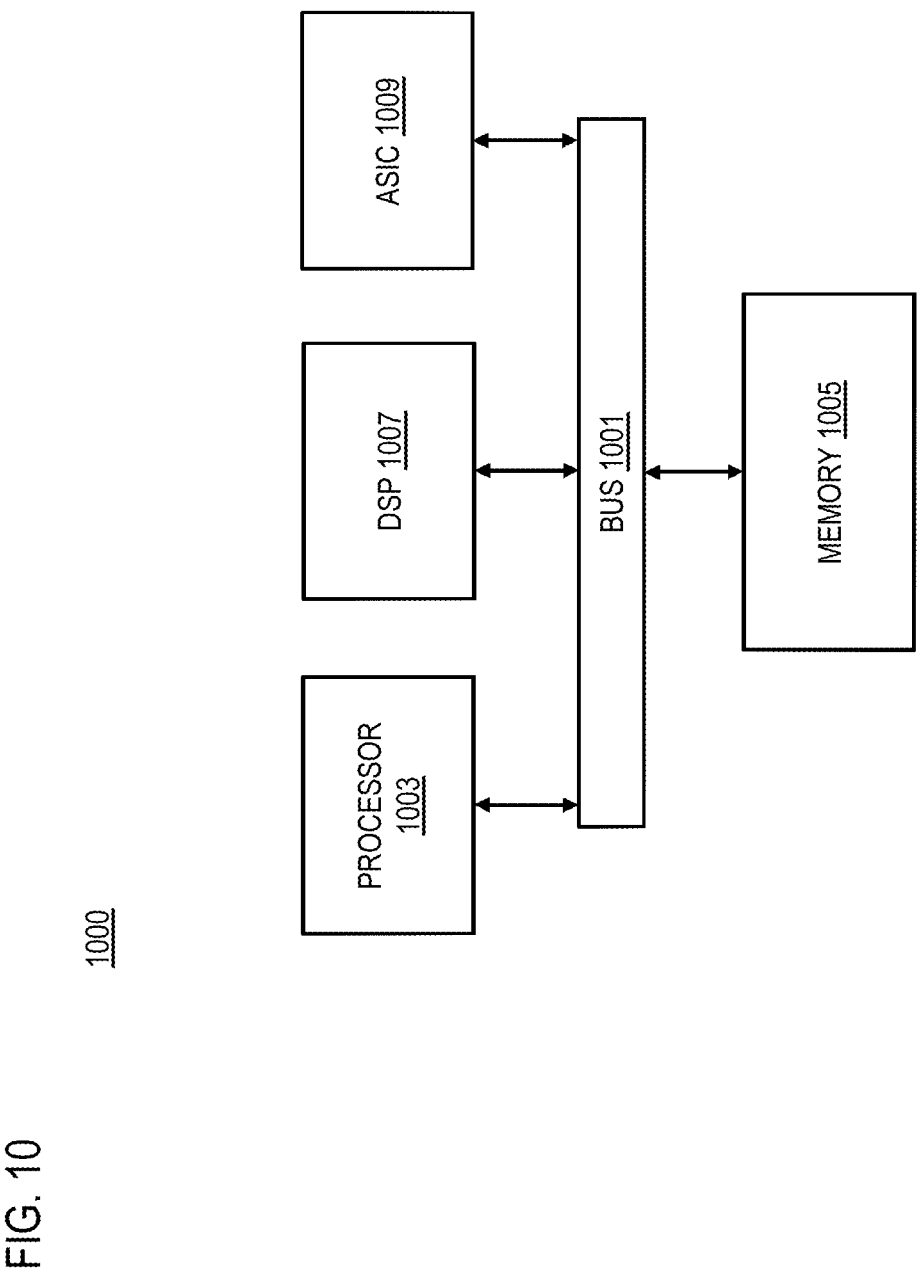
FIG. 10 is a diagram of a chip set that can be used to implement an embodiment of the invention.

FIG. 2 is a flowchart of a process for providing a vertex-based evaluation of polygon similarity, according to one embodiment. In one embodiment, the computer vision system 101 may perform one or more portions of the process 200 and may be implemented in, for instance, a chip set including a processor and a memory as shown in FIG. 10. As such, the computer vision system 101 can provide means for accomplishing various parts of the process 200. In addition or alternatively, a services platform 111 and/or one or more services 113a-113n (also collectively referred to as services 113) may perform any combination of the steps of the process 200 in combination with the computer vision system 101 or as standalone components. Although the process 200 is illustrated and described as a sequence of steps, it is contemplated that various embodiments of the process 200 may be performed in any order or combination and need not include all of the illustrated steps. The process 200 is discussed with respect to the examples of FIGS. 3-7E below.

In step 201, the computer vision system 101 processes an image to generate a first set of vertices of a first polygon a representing an object depicted in the image. For illustration, the embodiments of the process 200 are described with respect to detecting objects depicted in an image or sequence of images as two-dimensional polygons with vertices at the corners of the polygons. However, it is contemplated that the embodiments described herein can be generalized to a N-dimensional setting in which objects and/or corresponding polygons of any N-dimensions can be detected (e.g., three-dimensional polygons). For example, with respect to two-dimensional polygonal representation of objects, the vertices are located at points where two or more edges or boundaries of the polygonal representations. With respect to three-dimensional representations, the vertices are located at the points wherein three or more two-dimensional planes meet. Application of the various embodiments described herein to higher dimensions can then be generalized to N-dimensional representations based on the points where an N number of (N−1)-dimensional hyperplanes meet.

In one embodiment, the input image can be a raster image of size m by n image elements (that is, m rows and n columns of image elements). In this example, an image element refers to an element or cell of a grid created by the m rows and n columns of the raster image. In one embodiment, each image element corresponds to an individual pixel of the raster image, so that the number of rows and columns correspond to the pixel resolution of the image. Alternatively, each image element can refer to a group of pixels (e.g., 4 pixels of a 2×2 pixel group, 9 pixels of a 3×3 pixel group, 16 pixels of a 4×4 pixel group, etc.). Accordingly, it is contemplated that references to an image element can be used interchangeably with a pixel, and vice versa in the description of the embodiments described herein. In this way, in one embodiment, the computer vision system 101 can effectively downsample a higher resolution input image to reduce computer resource usage when a higher resolution of the input image is not needed or desired for a given use case. Although the image elements are described with respect to a two-dimensional image, it is contemplated that the image element can a three-dimensional image element (e.g., a cube version of a pixel), or a higher N dimension depending on the dimensional space of the polygons being compared.

In one embodiment, the computer vision system 100 can use any object detection approach known in the art (e.g., machine learning-based object detection using a CNN 107 and/or RNN 105) to generate polygon representations of detected objects including identifying the vertices of the polygon representations. For example, convolutional neural networks such as the CNN 107 have shown unprecedented ability to recognize objects in images, understand the semantic meaning of images, and segment images according to these semantic categories. In one embodiment, the CNN 107 can be used in combination with the RNN 105 to trace the contours an objected detected in the input image to generate a polygon representation and/or identify their vertices. For example, the computer vision system 101 can use the RNN 105 or other equivalent machine learning or neural network to traverse a feature map (e.g., a convolutional feature map encoding object features detected from an input image by the CNN 107) like a cursor (e.g., a cursor recurrent neural network). During the traversal, the RNN 105 uses information from its current location in the feature map to determine a location where the RNN 105 should go next to follow a detected contour of an object depicted in an input image.

In one embodiment, the output of the object detection process includes polygons representing the edges, boundaries, and/or vertices of detected objects. For example, the object detection processes can produce at least two polygons representing detected objects that can be evaluated for polygon similarity according to the various embodiments described herein. In this example, the output includes a first polygon a and a second polygon b, which can be wholly contained in at least one of the input raster images. In one embodiment, the first polygon a, the second polygon b, or a combination thereof is represented as list of polygon vertices in a data structure of (x, y) pairs representing the coordinate of the vertices. In one embodiment, the coordinates correspond to pixel locations in a rasterized image. The computer vision system 101 can then construct the boundaries the first polygon a and/or the second polygon b from the list of polygon vertices.

Figure 3:
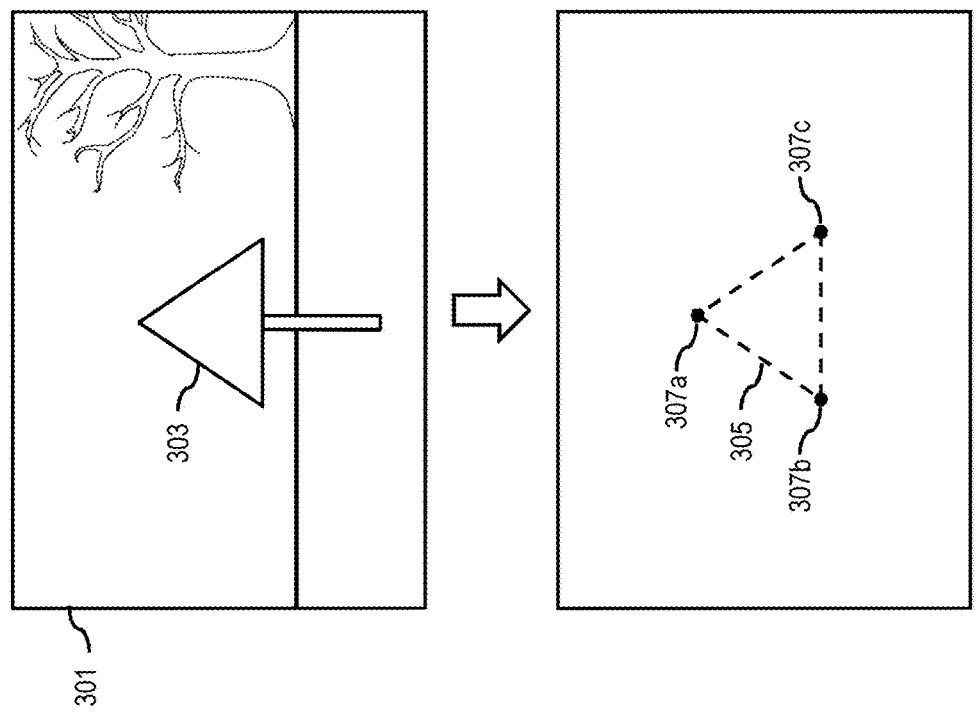
FIG. 3 is a diagram illustrating an example of object detection from an input image by a computer vision system, according to one embodiment.

FIG. 3 is a diagram illustrating an example of object detection from an input image by a computer vision system, according to one embodiment. As shown, an input image 301 is processed by the computer vision system 101 to identify pixels of the image corresponding to a sign 303 (e.g., the object of interest). In this example, the computer vision system 101 uses machine learning (e.g., the RNN 105 and/or CNN 107) or other equivalent processes to classify each pixel of the input image 301 as belonging to the depicted sign 303 or belonging to other objects/features depicted in the image (e.g., ground, sky, or trees). The output of this process is illustrated as the polygon 305 of FIG. 3 representing the sign 303 (e.g., the object of interest) as polygonal boundaries and associated vertices 307a-307b (also collectively referred to as vertices 307). As described above, the polygon 305 can be represented in a data structure by its vertices as denoted below:

polygon 305={vertex 307a,vertex 307b,vertex 307c} or generically as:

polygon $a=\{vertex_{a1}, \ldots, vertex_{an}\}$ where $vertex_a$ is expressed as a coordinate (e.g., (x, y), (x, y, z), etc.) of each vertex detected in polygon a, and n is the number of vertices in the polygon a.

Figure 4:
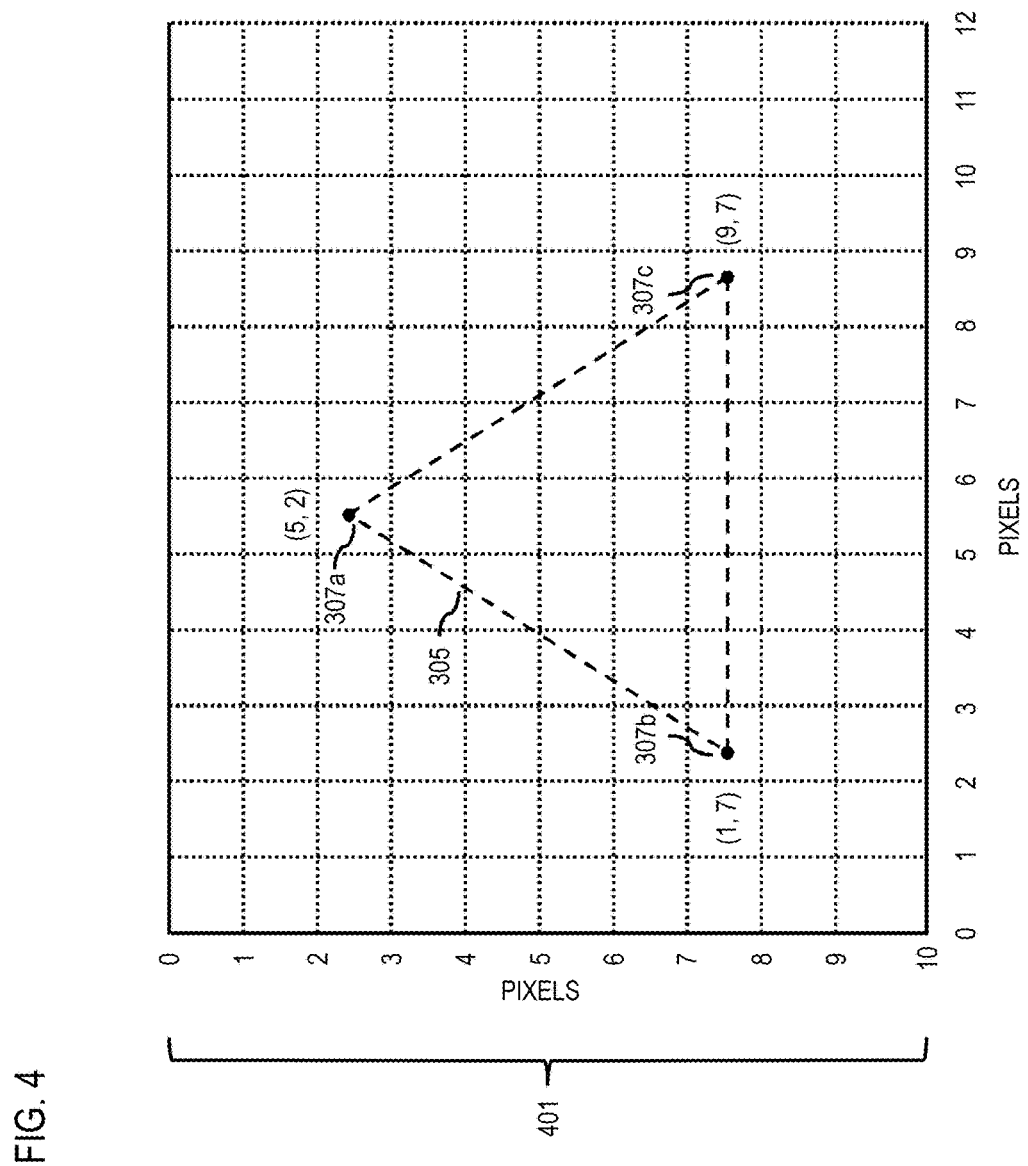
FIG. 4 is a diagram illustrating the vertices of a detected polygon with respect to a pixel grid, according to one embodiment.

FIG. 4 is a diagram illustrating the vertices of a detected polygon with respect to a pixel grid, according to one embodiment. In the example of FIG. 4, the detected polygon can be designated as the first polygon a or more specifically the polygon 305 as detected in the example of FIG. 3. As shown, the vertices 307a-307c of the polygon 305 are provided as pixel coordinates in a raster image 401 that is 10 pixels by 12 pixels. Vertex 307a is located at (5, 2), vertex 307b is located at (1, 7), and vertex 307c is located at (9, 7). Alternatively, in one embodiment, each grid of the image 401 can correspond to an image element representing an individual pixel or group of pixels (e.g., 4 pixels of a 2×2 pixel group, 9 pixels of a 3×3 pixel group, 16 pixels of a 4×4 pixel group, etc.) of the image 401. Accordingly, it is contemplated that references to an image element can be used interchangeably with a pixel, and vice versa in the description of the embodiments described herein. In this way, in one embodiment, the computer vision system 101 can effectively downsample a higher resolution input image to reduce computer resource usage when a higher resolution of the input image is not needed or desired for a given use case. Although the image elements are described with respect to a two-dimensional image, it is contemplated that the image element can a three-dimensional image element (e.g., a cube version of a pixel), or a higher N dimension depending on the dimensional space of the polygons being compared.

Although the examples of FIGS. 3 and 4 describe a polygon 305 (e.g., a first polygon a) that is a closed convex polygon, it is contemplated that the polygons a and/or b that are applicable to the embodiments described herein can be an open polygon, a closed polygon, a concave polygon, a convex polygon, or any combination thereof comprising any combination of detected polygonal boundaries. In one embodiment, the object can be any object depicted in the image including, but not limited to, two-dimensional objects, three-dimensional objects, edge-based objects where the edges are the objects of interest, etc.

In one embodiment, the first polygon a as processed from the input image (e.g., according to step 201) represents one of the two polygons that is to be compared using the embodiments of the vertex-based polygon similarity evaluation describe herein. To initiate the evaluation of polygon similarity between the first polygon a and a second polygon b, the computer vision system 101 selects or receives an input for selecting the second polygon b that is to be compared. In one embodiment, the second polygon b can also be represented a data structure by its vertices as denoted below:

polygon $b=\{vertex_{b1}, \ldots, vertex_{bn}\}$ where $vertex_b$ is expressed as a coordinate (e.g., (x, y), (x, y, z), etc.) of each vertex detected in polygon b, and n is the number of vertices in the polygon b.

In step 203, for each vertex in the first set of vertices of the first polygon a (e.g., polygon $a=\{vertex_{a1}, \ldots, vertex_{an}\}$), the computer vision system 101 determines a closest vertex in a second set of vertices of a second polygon b (e.g., polygon $b=\{vertex_{b1}, \ldots, vertex_{bn}\}$). In one embodiment, the computer vision system 101 can use any distance metric to determine the closest vertex including, but not limited to, Euclidean distance, city-block distance, chessboard distance, and/or the like. In step 205, the computer vision system 101 determines a distance between said each vertex in the first set of vertices and the closest vertex in the second set of vertices for the second polygon b for each vertex in the first set of vertices of the first polygon a. In on embodiment, the distance for each vertex of the first polygon a with respect to closest vertex of the polygon b is denoted as:

for $i=1$ to $n, D(\text{vertex}_{ai}, \text{vertex}_{bClosest}) = DM(\text{vertex}_{ai}, \text{vertex}_{bClosest})$ where n is the number of vertices in polygon a, $\text{vertex}_{ai}$ is each vertex in polygon a, $\text{vertex}_{bClosest}$ is the closest vertex of polygon a to each $\text{vertex}_{ai}$, and DM is the distance metric function based on the selected distance (e.g., Euclidean, city-block, chessboard, etc.).

Examples of the DM for different distance metrics include, but are not limited to:

$$DM_{Euclid}((x_1,y_1),(x_2,y_2)) = \sqrt{(x_1-x_2)^2+(y_1-y_2)^2}$$

$$DM_{City}((x_1,y_1),(x_2,y_2)) = |x_1-x_2|+|y_1-y_2|$$

$$DM_{Chess}((x_1,y_1),(x_2,y_2)) = \text{Max}(|x_1-x_2|,|y_1-y_2|)$$

where $DM_{Euclid}$ is the Euclidean distance metric, $DM_{City}$ is the city-block distance (or Manhattan distance or rectilinear distance), $DM_{Chess}$ is the chessboard distance (or Chebyshev distance), $(x_1, y_1)$ is a first vertex coordinate, and $(x_2, y_2)$ is a second vertex coordinate.

Figure 5A:
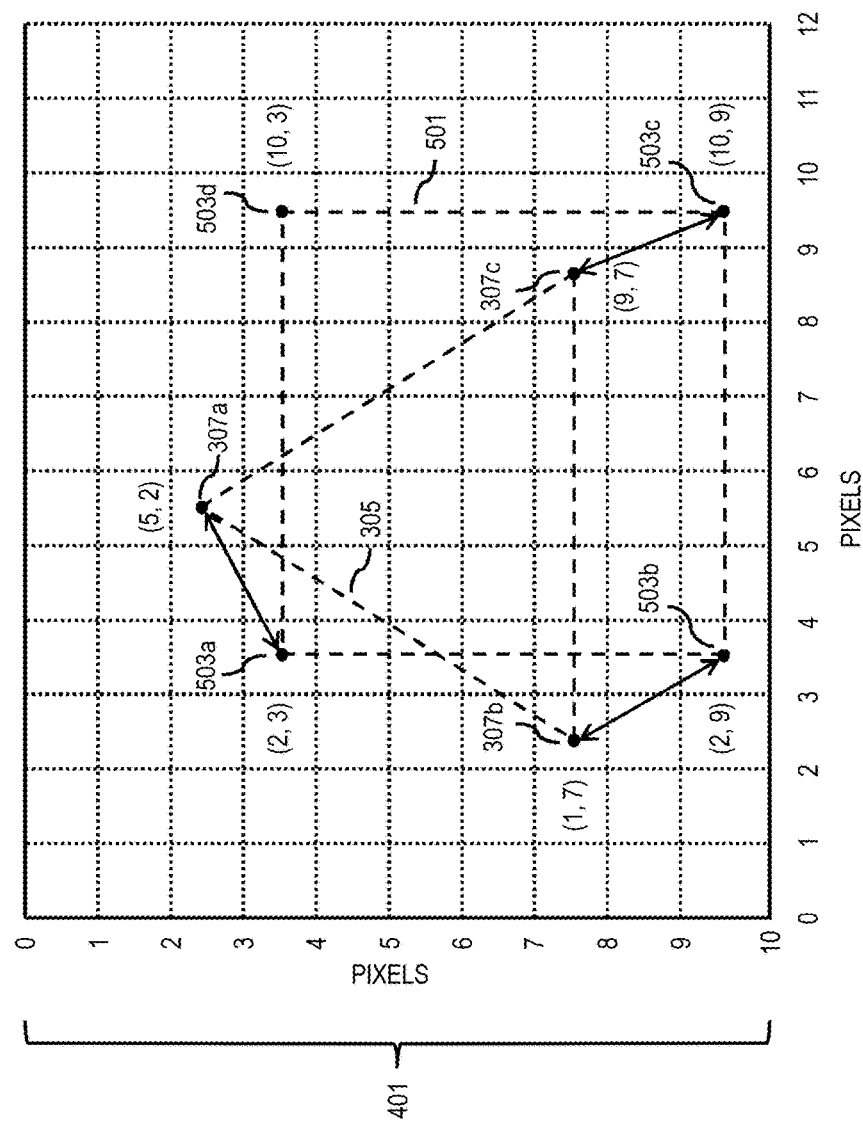
FIG. 5A is a diagram illustrating an example of calculating a vertex-based polygon similarity for a first polygon with respect to a second polygon, according to one embodiment.

FIG. 5A is a diagram illustrating an example of calculating a vertex-based polygon similarity for a first polygon a (e.g., polygon 305 representing sign 303) with respect to a second polygon b (e.g., polygon 501), according to one embodiment. In this example, polygon 305 (e.g., the first polygon a) has three vertices 307a-307c, and polygon 501 (e.g., the second polygon b) has four vertices 503a-503d (also collectively referred to as vertices 503). The determine a vertex-based polygon similarity of polygon 305 with respect to polygon 501, the computer vision system 101 determines which of the vertices 503 of the polygon 501 is closest to each of the three vertices 307 of the polygon 305, and computes their respective distances. It is noted that the number vertices 307 and 503 need not be equal in number, and that one vertex in polygon b can, in some cases, be the closest vertex to more than one vertex of polygon a. Table 1 below provides an example of this vertex distance determination using a Euclidean distance.

TABLE 1

| Polygon a vertex (pixel coordinate) | Closest vertex of polygon b (pixel coordinate) | Distance (pixels) |
|---|---|---|
| Vertex 307a (5, 2) | Vertex 503a (2, 3) | 3.16 |
| Vertex 307b (1, 7) | Vertex 503b (2, 9) | 2.24 |
| Vertex 307c (9, 7) | Vertex 503c (10, 9) | 2.24 |

In step 207, the computer vision system 101 calculates a polygon similarity of the first polygon a (e.g., polygon 305) with respect to the second polygon b (e.g., polygon 501) based the distances of vertices determined above. In one embodiment, this vertex-based polygon similarity on a total of the distance determined for each vertex in the first set of vertices of the first polygon a (e.g., each vertex 307 of the polygon 305) normalized to a number of vertices in the first set of vertices of the first polygon a (e.g., n=3 for polygon a). In one embodiment, this vertex-based polygon similarity is also referred to as a corner metric CM. When the CM is computed for the first polygon a with respect to the second polygon b, the resulting polygon similarity can be referred to as CM(a, b) and denoted as follows:

$$CM(a, b) = \frac{\sum_1^n DM(\text{vertex}_{ai}, \text{vertex}_{bCloset})}{n}$$

where n is the number of vertices in polygon a, $\text{vertex}_{ai}$ is each vertex in polygon a, $\text{vertex}_{bCloset}$ is the closest vertex of polygon b to each $\text{vertex}_{ai}$, and DM is the distance metric function based on the selected distance (e.g., Euclidean, city-block, chessboard, etc.).

Continuing with the example of FIG. 5A, the computer vision system 101 can use the embodiments of CM(a, b) described herein with the distance values of Table 1 to calculate a corner metric or vertex-based polygon similarity for polygon 305 with respect to polygon 501 as follows:

$$CM(\text{polygon } 305, \text{polygon } 501) = \frac{(3.16+2.24+2.24)}{3} = 2.55$$

Semantically, this corner metric or vertex-based polygon similarity CM(a, b) represents the average distance that each vertex of the polygon a is from a closest vertex of the polygon b. A zero value indicates that the vertices of the two polygons a and b are coincident, and higher values indicate greater distances or lack of similarity. According to this metric, there is a lower bound of 0 for the metric and no upper bound (e.g., meaning that the vertices of polygon a can be on average infinitely far from the vertices of the polygon b). In one embodiment, the specific threshold or actionable level (e.g., threshold to distinguish between similar and non-similar polygons) can depend on the use case.

Note that a polygon similarity determined according to vertex-based polygon similarity or corner metric (e.g., CM(a, b)) is normalized by the number of vertices of one of the two polygons a and b being compared, rather than the area of their union in the case of the traditional IoU. For use-cases in which the vertices of the detected polygons are the objects of interest, the polygon similarity using a corner metric according to the various embodiment described herein provides a more direct indication of similarity, and advantageously improves the sensitivity of the computer vision system 101 when detecting fine edge differences.

As described previously, the embodiments of polygon similarity described herein are asymmetric such that CM(a, b) is not in general equal to CM(b, a). This asymmetry provides for a finer measure of granularity in the polygon evaluation process: e.g., it may be the case that polygon a is considered "close" to polygon b but not vice-versa. In one example use case, if polygon a represents a ground-truth object, and polygon b a predicted object, then the corner metric of a with respect to b, CM(a, b), is an indication of recall, while the corner metric of b with respect to a, CM(b, a) is an indication of precision.

Accordingly, in one embodiment, the computer vision system 101 can similarly determine CM(b, a) in addition to CM(a, b). For example, the computer vision system 101 can calculate a polygon similarity of the second polygon b with respect to the first polygon a, CM(b, a), by substituting the second polygon b for the first polygon a and vice versa in the embodiments of processes and equations described above. When substituting b for a and vice versa to determine the corner metric, the corner metric of the polygon b with respect to a can be denoted as follows:

$$CM(b, a) = \frac{\sum_1^n DM(\text{vertex}_{bi}, \text{vertex}_{aCloset})}{n}$$

where n is the number of vertices in polygon b, $vertex_{bi}$ is each vertex in polygon b, $vertex_{aClosest}$ is the closest vertex of polygon a to each $vertex_{bi}$, and DM is the distance metric function based on the selected distance (e.g., Euclidean, city-block, chessboard, etc.).

Accordingly, in one embodiment, for each vertex in the second set of vertices of the polygon b, the computer vision system 101 determines a closest vertex in the first set of vertices of the first polygon a, and determines a distance between each vertex in the second set of vertices of the polygon b and the closest vertex in the first set of vertices of the first polygon a. The computer vision system 101 then calculates a polygon similarity of the second polygon b with respect to the first polygon a based on the total of the distance determined for each vertex in the second set of vertices normalized to another number of vertices in the second set of vertices.

Figure 5B:
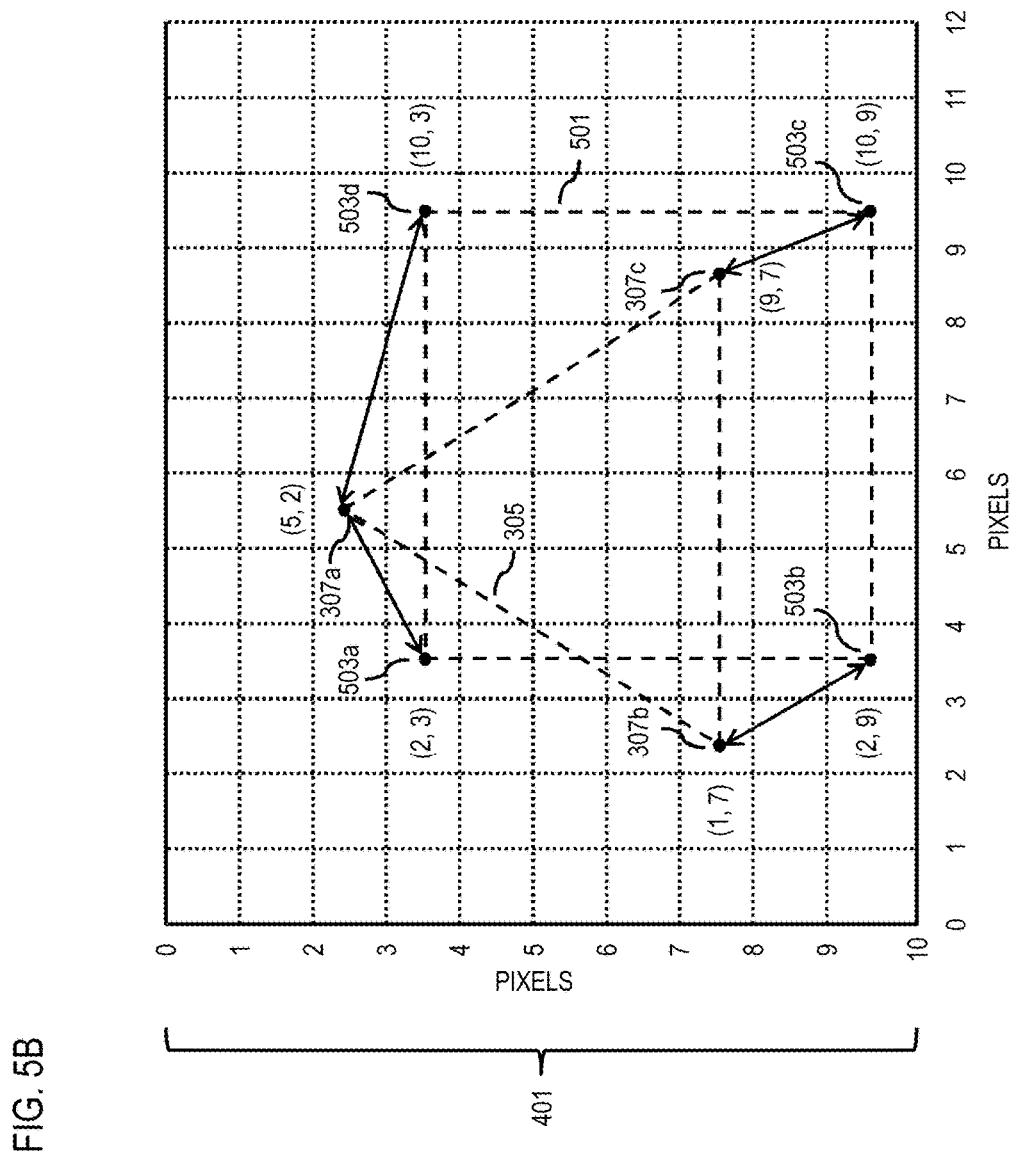
FIG. 5B is a diagram illustrating an example of calculating a vertex-based polygon similarity for a second polygon with respect to a first polygon for an asymmetric polygon similarity, according to one embodiment.

FIG. 5B is a diagram illustrating an example of calculating a vertex-based polygon similarity for a second polygon b with respect to a first polygon a for an asymmetric polygon similarity, according to one embodiment. The example of FIG. 5B continues the example of FIG. 5A, but instead shows the distance relationships between the vertices 503 of polygon 501 (e.g., polygon b) with respect to the closest vertex 307 of polygon 305 (e.g., polygon a). Table 2 below provides an example of the vertex distance determination of polygon 501 with respect to polygon 305.

TABLE 2

| Polygon b vertex (pixel coordinate) | Closest vertex of polygon a (pixel coordinate) | Distance (pixels) |
|---|---|---|
| Vertex 503a (2, 3) | Vertex 307a (5, 2) | 3.16 |
| Vertex 503b (2, 9) | Vertext 307b (1, 7) | 2.24 |
| Vertex 503c (10, 9) | Vertex 307c (9, 7) | 2.24 |
| Vertex 503d (10, 3) | Vertex 307a (5, 2) | 5.10 |

The computer vision system 100 can then calculate the corner metric of polygon 501 with respect to the polygon 305 based on the distances calculated in Table 2 as follows:

$$CM(\text{polygon } 501, \text{polygon } 305) = \frac{(3.16 + 2.24 + 2.24 + 5.10)}{4} = 3.19$$

Comparing, this CM(polygon 501, polygon 305) value of 3.19 to the CM(polygon 305, polygon 501) value of 2.55 calculated previously, the asymmetry or difference is apparent. Semantically, the corner metrics indicate that the vertices of polygon a is closer in similarity to the vertices of polygon b than the vertices of polygon b is to the vertices of polygon a. As noted previously, the capability to detect this asymmetry can improve the performance of the computer vision system 101 (e.g., increase system sensitivity or granularity) when supporting use cases where vertices are the objects of interest or the direction of comparison is important (e.g., distinguishing between recall and precision of object detection with respect to ground truth objects as previously described).

In one embodiment, when comparing two polygons a and b, the computer vision system 101 can calculate both a vertex-based polygon similarity/corner metric of the first polygon a with respect to the second polygon b, CM(a, b), and a corner metric of the second polygon b with respect to the first polygon a, CM(b, a). In this way, the computer vision system 101 can output an asymmetric polygon similarity for the first polygon a and the second polygon b as a pair comprising CM(a, b) and CM(b, a). This paired asymmetric polygon similarity, $CM(a, b)_{paired}$, can be denoted as:

$$CM(a,b)_{paired} = \{CM(a,b), CM(b,a)\}$$

In other words, in one embodiment, the final output of the computer vision system 101's vertex-based polygon similarity evaluation is the paired corner metric $CM(a, b)_{paired}$ that is given by the pair of numbers (corner metric of a with respect to b, corner metric of b with respect to a). With respect to the example of FIGS. 5A-5B, the paired asymmetric output CM(polygon 305, polygon 501)$_{paired}$ is as follows:

$$DT(\text{polygon } 305, \text{polygon } 501)_{paired} = \{2.55, 3.19\}$$

Alternatively, to generate a symmetric polygon similarity evaluation as a final output for this example, the computer vision system 101 can average the two values in the asymmetric pair. Therefore, $CM(a, b)_{Symmetric}$ can be denoted as follows:

$$CM(a,b)_{Symmetric} = \text{Average}(CM(a,b), CM(b,a))$$

With respect to the example of FIGS. 5A-5B, the symmetric corner metric can be computed as follows:

$$CM(\text{polygon } 305, \text{polygon } 501) = \text{Average}(2.55, 3.19)$$
$$= 2.87$$

As previously discussed, this computed corner metric or vertex-based polygon similarity (asymmetric or symmetric) can be applied in any type of object detection use case. For example, in step 209, the computer vision system 101 optionally transmits the corner metric to a mapping platform (e.g., as part of the services platform 111) to support vehicle localization (e.g., see example of FIGS. 6A-6B below) and/or other use cases such as facial recognition for video surveillance (e.g., see example of FIGS. 7A-7C below). In most use cases, the corner metric can be used to confirm a detection of an object of interest in an image based on the vertex-based polygon similarity of the first polygon a with respect to the second polygon b, the polygon similarity of the second polygon b with respect to the first polygon a, the asymmetric polygon similarity (e.g., $CM(a, b)_{paired}$), a symmetric polygon similarity generated from asymmetric pair, or a combination thereof. For example, the computer vision system 101 can specify a maximum threshold (e.g., maximum distance) between two polygons to classify the two polygons as similar. If the polygon similarity metric determined according to the various embodiments described herein is below the threshold the two polygons can be designated as being similar, with metric values above the threshold being designated as not similar. In other embodiments, if an object is being compared to two or more possible matches, the polygon similarity metrics can be computed for each possible match with the final match having a minimum metric value.

Figure 7A:
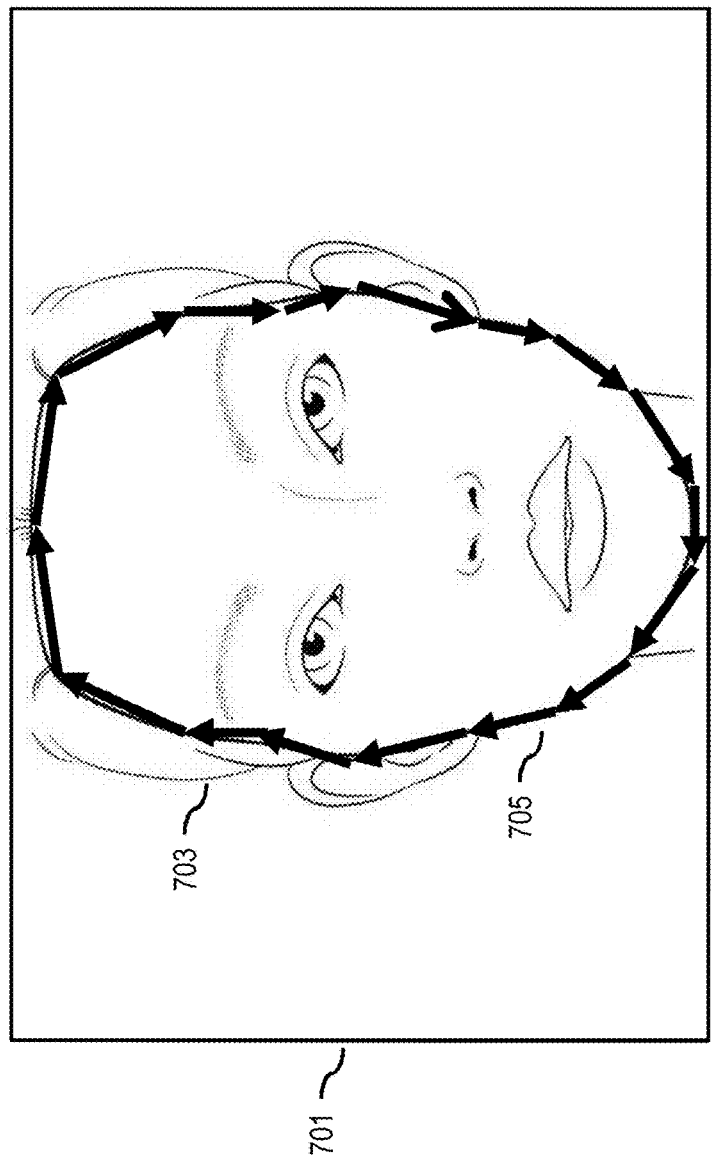
FIGS. 7A-7C are diagrams illustrating an example use case of a vertex-based polygon similarity evaluation for video surveillance facial recognition, according to one embodiment.
Figure 7B:
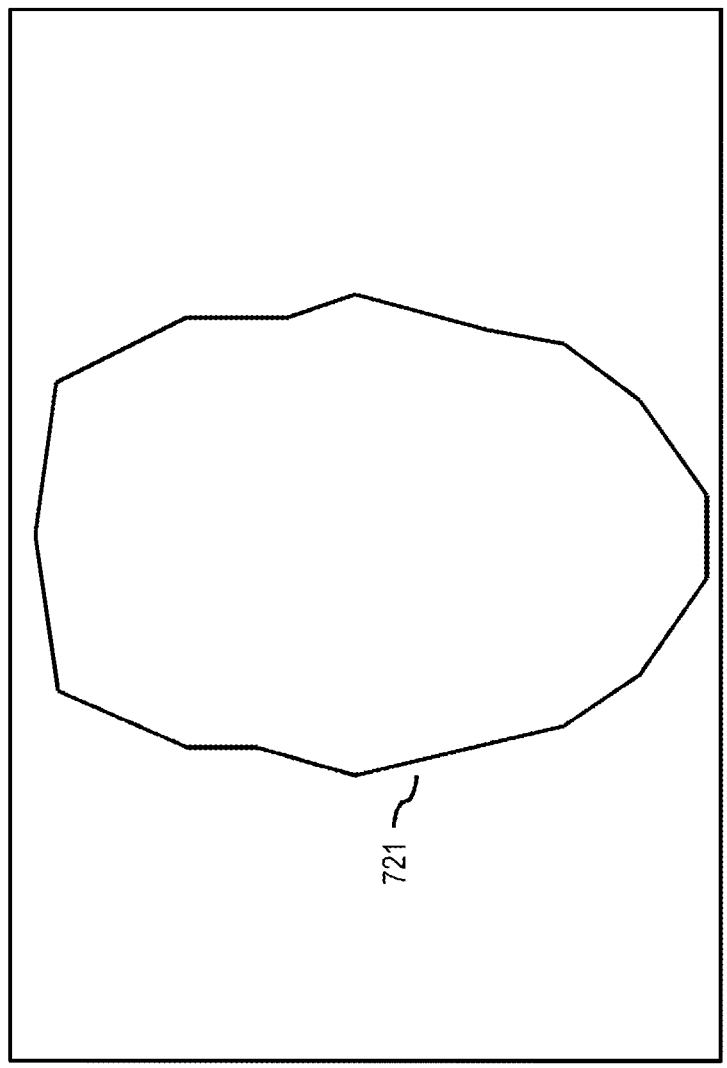

As noted above, the embodiments of evaluating polygon similarity described herein can be used for any number of object detection use cases. FIGS. 7A and 7B are diagrams illustrating an example use case of a vertex-based polygon similarity evaluation for vehicle localization using visual odometry, according to one embodiment. Understanding a vehicle's location on a map enables planning of a route, both on fine and coarse scales. Such an understanding is particularly important for autonomous driving where high accuracy and real-time localization of vehicles (e.g., a vehicle 103*c*) are needed. Generally, for autonomous driving and other similar use cases, a localization accuracy of around 10 cm is needed for safe driving. One way to achieve this level of accuracy is to use visual odometry, in which features or objects are detected from imagery. These features can then be matched to a database of the known locations of the features to determine the vehicle's position location. In one embodiment, this matching can be performed by comparing the detected object against reference or ground-truth objects with known camera poses (e.g., a location, angle, tilt, orientation, etc. of a camera mounted on the vehicle 103c that is capturing images to process for visual odometry).

Figure 6A:
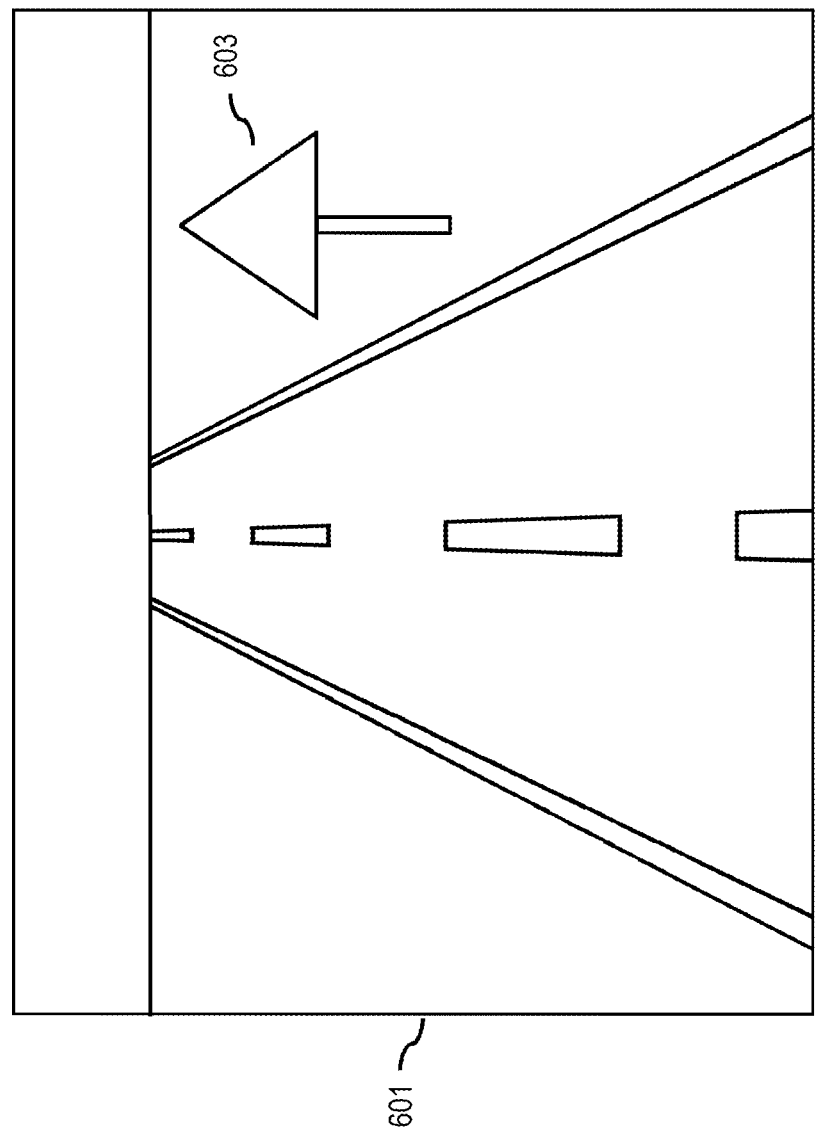
FIGS. 6A and 6B are diagrams illustrating an example use case of a vertex-based polygon similarity evaluation for vehicle localization using visual odometry, according to one embodiment.
Figure 6B:
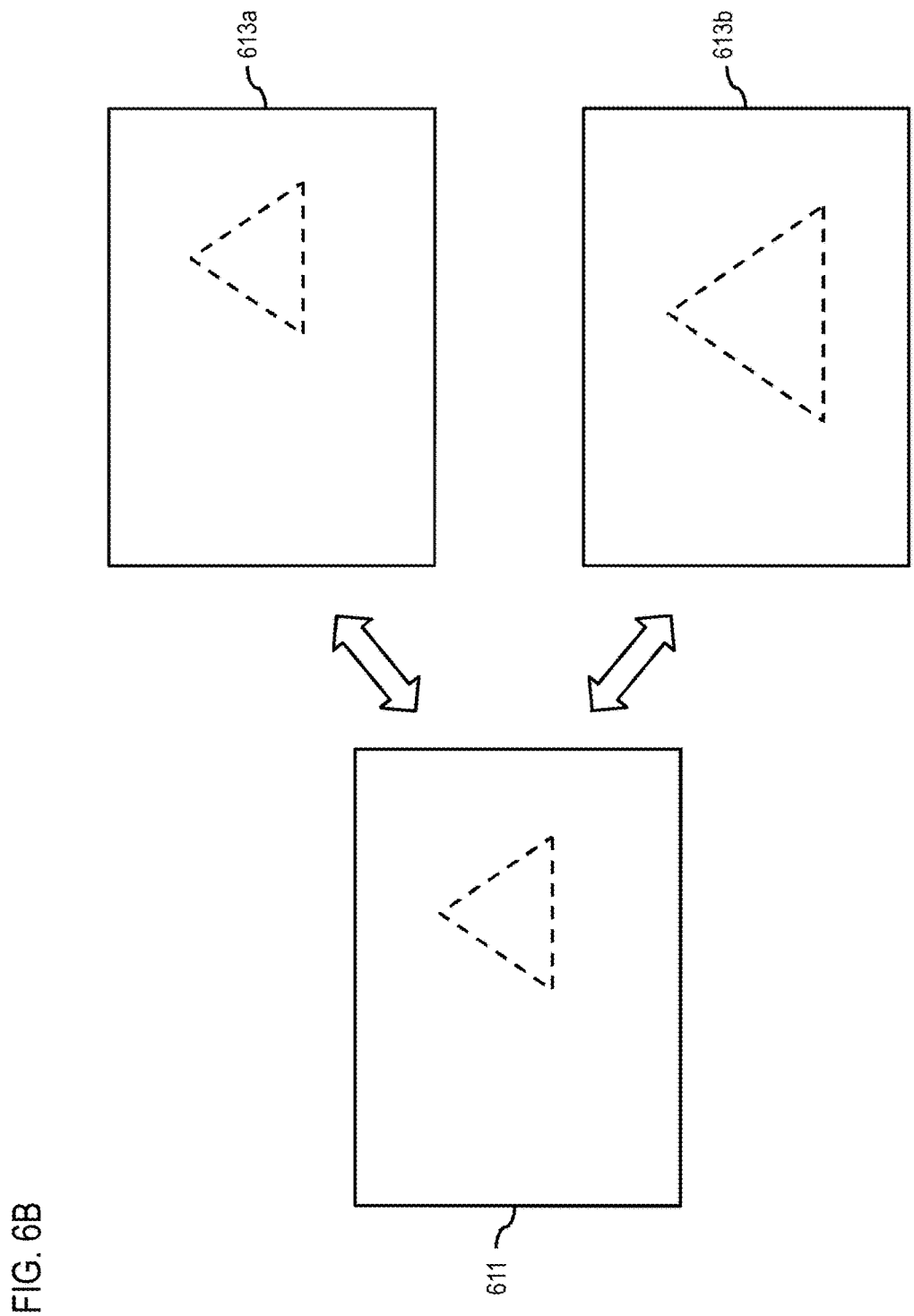

As shown, FIG. 6A illustrates an image 601 captured by a camera of a vehicle 103c traveling on a roadway. The computer vision system 101 detects an object of interest (e.g., a road sign 603) in the image whose location is known (e.g., location stored in geographic database 115) and that can be used for visual odometry. The computer vision system 101 recognizes the road sign 603 and creates a polygonal representation 611 of the road sign 603 as shown in FIG. 6B. In one embodiment, the polygonal representation 611 includes a set of polygon vertices representing the shape of the detected object. The computer vision system 101 can then retrieve ground truth representations 613a and 613b that depict the known road sign 603 from different known camera poses. For example, ground truth representation 613a includes a polygon representing the road sign 603 as its vertices would appear from a first known distance and camera pose, and ground truth representation 613b includes a polygon representing the road sign 603 as its vertices would appear from a second known distance and camera pose. The computer vision system 100 then evaluates the corner metric or vertex-based polygon similarity between the detected polygon 611 against each of the ground truth polygons 613a and 613b according to the embodiments described herein. The distance and camera pose of the ground truth polygon 613a or 613b with the lowest computed corner metric can then be selected as the camera pose of the detected polygon 611 and corresponding road sign 603. The greater vertex sensitivity of the embodiments of the polygon similarity metric described herein enables the computer vision system 101 to more precisely detect slight differences in vertex locations (e.g., down to the pixel level), thereby advantageously increasing the precision of the resulting localization of the vehicle 103c.

Figure 7C:
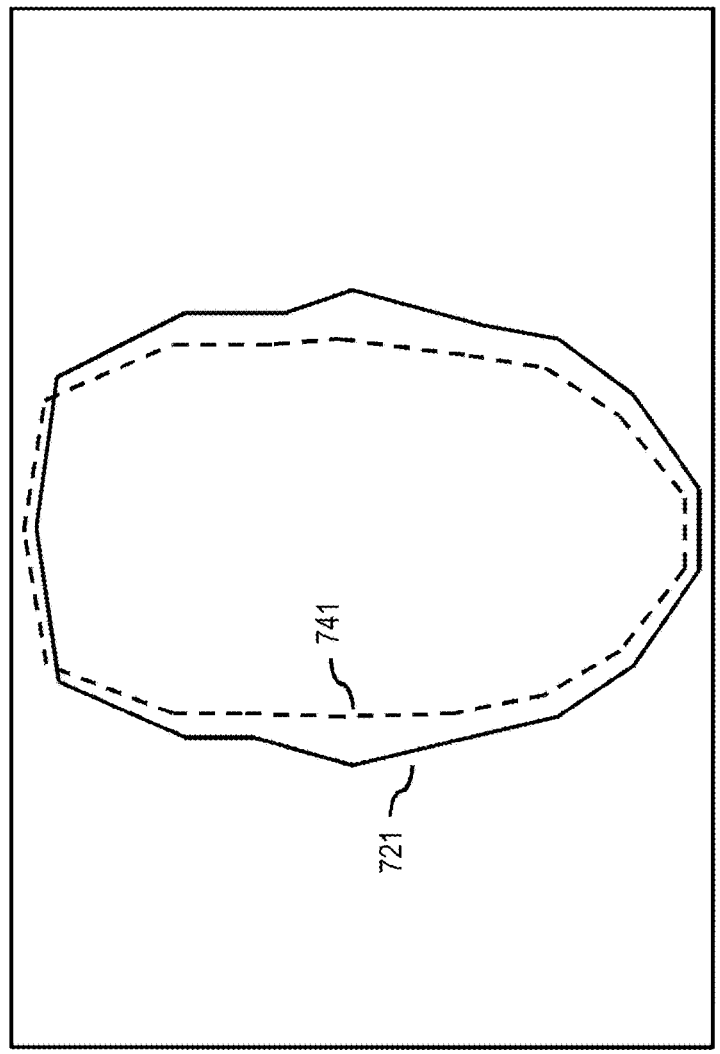

FIGS. 7A-7C are diagrams illustrating an example use case of a vertex-based polygon similarity evaluation for video surveillance facial recognition, according to one embodiment. As shown in FIG. 7A, a video surveillance camera 103a captures an image 701 depicting a human face 703. The computer vision system 101 uses machine learning processes (e.g., RNN 105 and/or CNN 107) to detect and perform tracings 705 around the contours of the face 703 to generate a polygonal representation 721 (as shown in FIG. 7B) of the face 703. As shown in FIG. 7B, the polygonal representation 721 is a complex polygon with numerous vertices representing the contours of the face 703. In one embodiment, the computer vision system 101 can then select a reference polygon 741 of another face for comparison against the polygonal representation 721 as shown in FIG. 7C. This reference polygon 741 also includes a set of vertices describing its contours. The computer vision system 101 can then use the corner metric according to the embodiments described herein to determine a vertex-based polygon similarity of the polygonal representation 721 of the face 703 against the reference polygon 741 of the reference face using their respective vertices. In this way fine grain differences or similarities between the two polygons 721 and 741 can be quantified. If the resulting corner metric is below a threshold value, the computer vision system 101 can designate that the polygonal representation 721 and the polygon 741 are similar and indicate a likely match between the face 703 and a reference face associated with the reference polygon 741.

Returning to FIG. 1, as shown, the system 100 includes the computer vision system 101 configured to detect objects as polygon and to evaluate the similarity of the polygons using the asymmetric corner metric described according to the various embodiments described herein. In one embodiment, the computer vision system 101 includes or is otherwise associated with one or more machine learning networks for object detection from image data (e.g., the CNN 107 for generating object feature maps from input images, and the RNN 105 for traversing the feature map to iteratively and directly output coordinates of the contours of the objects as polygon or polygon vertices). In one embodiment, the computer vision system 101 includes sensors (e.g., camera sensors) and related components for automatically detecting objects of interest in image data. The computer vision system 101 can be a standalone component or can be incorporated into any of the surveillance device 103a, IoT device 103b, vehicle 103c, and/or any other device capable of visual object detection.

In one embodiment, at least one machine learning network of the computer vision system 101 is a traditional convolutional neural network (e.g., the CNN 107) which consists of multiple layers of collections of one or more neurons (e.g., processing nodes of the neural network) which are configured to process a portion of an input image. In one embodiment, the receptive fields of these collections of neurons (e.g., a receptive layer) can be configured to correspond to the area of an input image delineated by a respective a grid cell generated as described above. In addition, the computer vision system 101 can also include a recurrent neural network in which connections between nodes or neurons of the network form a directed cycle to enable dynamic temporal behavior. In contrast to convolutional neural networks, recurrent neural networks have internal memories that can store sequential information or inputs to generate output features. It is contemplated that any type of recurrent neural network can be used with the embodiments described herein including, but not limited to: (1) recursive neural networks including tensor-based recursive neural networks that enable traversing of graph-like structures in topological order; (2) a fully recurrent network comprising neurons or nodes with a directed connection to each other neuron or node; etc.

In one embodiment, the computer vision system 101 also has connectivity or access to a polygon database 109 for storing or retrieving polygonal representations of objects of interest. By way of example, each polygon representation can be stored in the polygon database 109 a data record or structure comprising a list of (x, y) coordinates indicate the vertices of the polygon. In one embodiment, the computer vision system 101 also has connectivity the geographic database 115 which stores representations of mapped geographic features to facilitate visual odometry to increase localization accuracy. The geographic database 115 can also store polygonal representations of ground truth or reference objects (e.g., signs, road markings, lane lines, buildings, landmarks, etc.) that can be detected for visual odometry and/or other mapping related functions.

In one embodiment, the computer vision system 101 has connectivity over a communication network 117 to the services platform 111 that provides one or more services 113. By way of example, the services 113 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 113 uses the output of the computer vision system 101 (e.g., polygon similarity evaluations, object detections, lane line coordinates, polylines, lane attribute, lane features, etc.) to localize the vehicle 103c or a user equipment 119 (e.g., a portable navigation device, smartphone, portable computer, tablet, etc.) to provide services 113 such as navigation, mapping, other location-based services, etc.

In one embodiment, the computer vision system 101 may be a platform with multiple interconnected components. The computer vision system 101 may include multiple servers, intelligent networking devices, computing devices, components and corresponding software for asymmetric evaluation of polygon similarity according to the various embodiments described herein. In addition, it is noted that the computer vision system 101 may be a separate entity of the system 100, a part of the one or more services 113, a part of the services platform 111, or included within the surveillance device 103a, IoT device 103b, vehicle 103c, and/or UE 119.

In one embodiment, content providers 121a-121m (collectively referred to as content providers 121) may provide content or data (e.g., including geographic data, parametric representations of mapped features, etc.) to the geographic database 115, the computer vision system 101, the services platform 111, the services 113, the UE 119, the vehicle 103c, and/or an application 123 executing on the UE 119. The content provided may be any type of content, such as polygonal representations of objects (e.g., including ground truth polygons), map content, textual content, audio content, video content, image content, etc. In one embodiment, the content providers 121 may provide content that may aid in the evaluation of polygon similarity according to the various embodiments described herein. In one embodiment, the content providers 121 may also store content associated with the polygon database 109, geographic database 115, computer vision system 101, services platform 111, services 113, UE 119, surveillance device 103a, IoT device 103b, and/or vehicle 103c. In another embodiment, the content providers 121 may manage access to a central repository of data, and offer a consistent, standard interface to data, such as a repository of the geographic database 115.

In one embodiment, the UE 119, surveillance device 103a, IoT device 103b, and/or vehicle 103c may execute the software application 123 to detect objects in images and/or evaluate polygon similarity according the embodiments described herein. By way of example, the application 123 may also be any type of application that is executable on UE 119, surveillance device 103a, IoT device 103b, and/or vehicle 103c, such as device control applications, autonomous driving applications, mapping applications, location-based service applications, navigation applications, content provisioning services, camera/imaging application, media player applications, social networking applications, calendar applications, and the like. In one embodiment, the application 123 may act as a client for the computer vision system 101 and perform one or more functions associated with detecting objects as polygons/vertices using a cursor recurrent neural network alone or in combination with the computer vision system 101.

By way of example, the UE 119, surveillance device 103a, and/or IoT device 103b, is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 119, surveillance device 103a, and/or IoT device 103b can support any type of interface to the user (such as "wearable" circuitry, etc.). In one embodiment, the UE 119 may be associated with or be a component of the surveillance device 103a, IoT device 103b, and/or vehicle 103c.

In one embodiment, the UE 119, surveillance device 103a, IoT device 103b, and/or vehicle 103c are configured with various sensors for generating or collecting environmental image data (e.g., for the computer vision system 101), related geographic data, etc. In one embodiment, the sensed data represent sensor data associated with a geographic location or coordinates at which the sensor data was collected, and polygonal representations of detected objects of interest. By way of example, the sensors may include a global positioning sensor for gathering location data (e.g., GPS), IMUS, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the UE 119, surveillance device 103a, IoT device 103b, and/or vehicle 103c may include light sensors, orientation sensors augmented with height sensors and acceleration sensor (e.g., an accelerometer can measure acceleration and can be used to determine orientation of the vehicle), tilt sensors to detect the degree of incline or decline (e.g., slope) of the vehicle along a path of travel, moisture sensors, pressure sensors, etc. In a further example embodiment, sensors about the perimeter of the UE 119, surveillance device 103a, IoT device 103b, and/or vehicle 103c may detect the relative distance of the device or vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 119, surveillance device 103a, IoT device 103b, and/or vehicle 103c may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 117 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the computer vision system 101, services platform 111, services 113, UE 119, surveillance device 103a, IoT device 103b, vehicle 103c, and/or content providers 121 communicate with each other and other components of the system 100 using well known, new or still developing protocols. In this context, a protocol includes a set of rules defining how the network nodes within the communication network 117 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
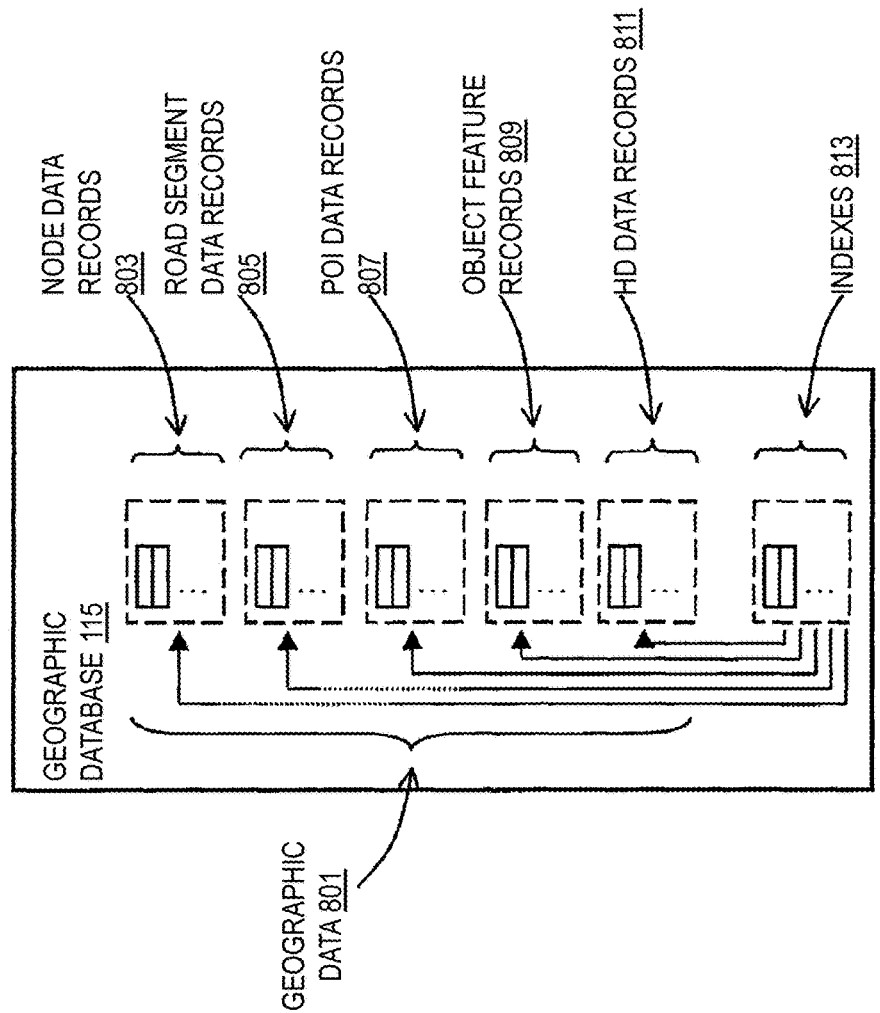
FIG. 8 is a diagram of a geographic database, according to one embodiment.

FIG. 8 is a diagram of a geographic database, according to one embodiment. In one embodiment, the geographic database 115 includes geographic data 801 used for (or configured to be compiled to be used for) mapping and/or navigation-related services, such as for visual odometry based on the evaluation of polygon similarity according to the embodiments described herein. In one embodiment, the geographic database 115 include high definition (HD) mapping data that provide centimeter-level or better accuracy of map features. For example, the geographic database 115 can be based on Light Detection and Ranging (LiDAR) or equivalent technology to collect billions of 3D points and model road surfaces and other map features down to the number lanes and their widths. In one embodiment, the HD mapping data (e.g., HD data records 811) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). In one embodiment, these polygons can also represent ground truth or reference objects (e.g., signs, road markings, lane lines, landmarks, etc.) used for visual odometry. For example, the vertices of the polygons can define shapes that correspond to the boundaries or edges of the respective geographic feature. In the case of a building, a two-dimensional polygon can be used to represent a footprint of the building, and a three-dimensional polygon extrusion can be used to represent the three-dimensional surfaces of the building. Accordingly, the terms polygons and polygon extrusions as used herein can be used interchangeably.

In one embodiment, the following terminology applies to the representation of geographic features in the geographic database 115.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 115 follows certain conventions. For example, links do not cross themselves and do not cross each other except at a node. Also, there are no duplicated shape points, nodes, or links. Two links that connect each other have a common node. In the geographic database 115, overlapping geographic features are represented by overlapping polygons. When polygons overlap, the boundary of one polygon crosses the boundary of the other polygon. In the geographic database 115, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 115 includes node data records 803, road segment or link data records 805, POI data records 807, object feature records 809, HD mapping data records 811, and indexes 813, for example. More, fewer or different data records can be provided. In one embodiment, additional data records (not shown) can include cartographic ("carto") data records, routing data, and maneuver data. In one embodiment, the indexes 813 may improve the speed of data retrieval operations in the geographic database 115. In one embodiment, the indexes 813 may be used to quickly locate data without having to search every row in the geographic database 115 every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points corresponding to the respective links or segments of the road segment data records 805. The road link data records 805 and the node data records 803 represent a road network, such as used by vehicles, cars, and/or other entities. Alternatively, the geographic database 115 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 115 can include data about the POIs and their respective locations in the POI data records 807. The geographic database 115 can also include data about places, such as cities, towns, or other communities, and other geographic features, such as bodies of water, mountain ranges, etc. Such place or feature data can be part of the POI data records 307 or can be associated with POIs or POI data records 807 (such as a data point used for displaying or representing a position of a city).

In one embodiment, the geographic database 115 can also include object feature records 809 for storing objects of interest (e.g., as polygonal, polyline, and/or parametric representations) that can be used for visual odometry according to the various embodiments described herein. In one embodiment, the geographic database 115 can also store the data related to evaluating polygon similarity and/or historically calculated similarity values. By way of example, the object feature records 809 can be associated with one or more of the node records 803, road segment records 805, and/or POI data records 807 to support localization or visual odometry based on the features stored therein and the corresponding estimated quality of the features. In this way, the object feature records 809 can also be associated with the characteristics or metadata of the corresponding record 803, 805, and/or 807.

In one embodiment, as discussed above, the HD mapping data records 811 model road surfaces and other map features to centimeter-level or better accuracy (e.g., including centimeter-level accuracy for ground truth objects used for visual odometry based on polygon similarity according to the embodiments described herein). The HD mapping data records 811 also include ground truth object models that provide the precise object geometry with polygonal boundaries, as well as rich attributes of the models. These rich attributes include, but are not limited to, object type, object location, lane traversal information, lane types, lane marking types, lane level speed limit information, and/or the like. In one embodiment, the HD mapping data records 811 are divided into spatial partitions of varying sizes to provide HD mapping data to the UE 119, surveillance device 103a, IoT device 103b, vehicles 103c, and/or other end user devices with near real-time speed without overloading the available resources of the devices (e.g., computational, memory, bandwidth, etc. resources).

In one embodiment, the HD mapping data records 811 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 811.

In one embodiment, the HD mapping data records 811 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 115 can be maintained by the content provider 121 in association with the services platform 111 (e.g., a map developer). The map developer can collect geographic data to generate and enhance the geographic database 115. There can be different ways used by the map developer to collect data. These ways can include obtaining data from other sources, such as municipalities or respective geographic authorities. In addition, the map developer can employ field personnel to travel by vehicle (e.g., vehicle 103c and/or UE 119) along roads throughout the geographic region to observe features and/or record information about them, for example. Also, remote sensing, such as aerial or satellite photography, can be used.

The geographic database 115 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 103c or UE 119, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing a vertex-based evaluation of polygon similarity may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
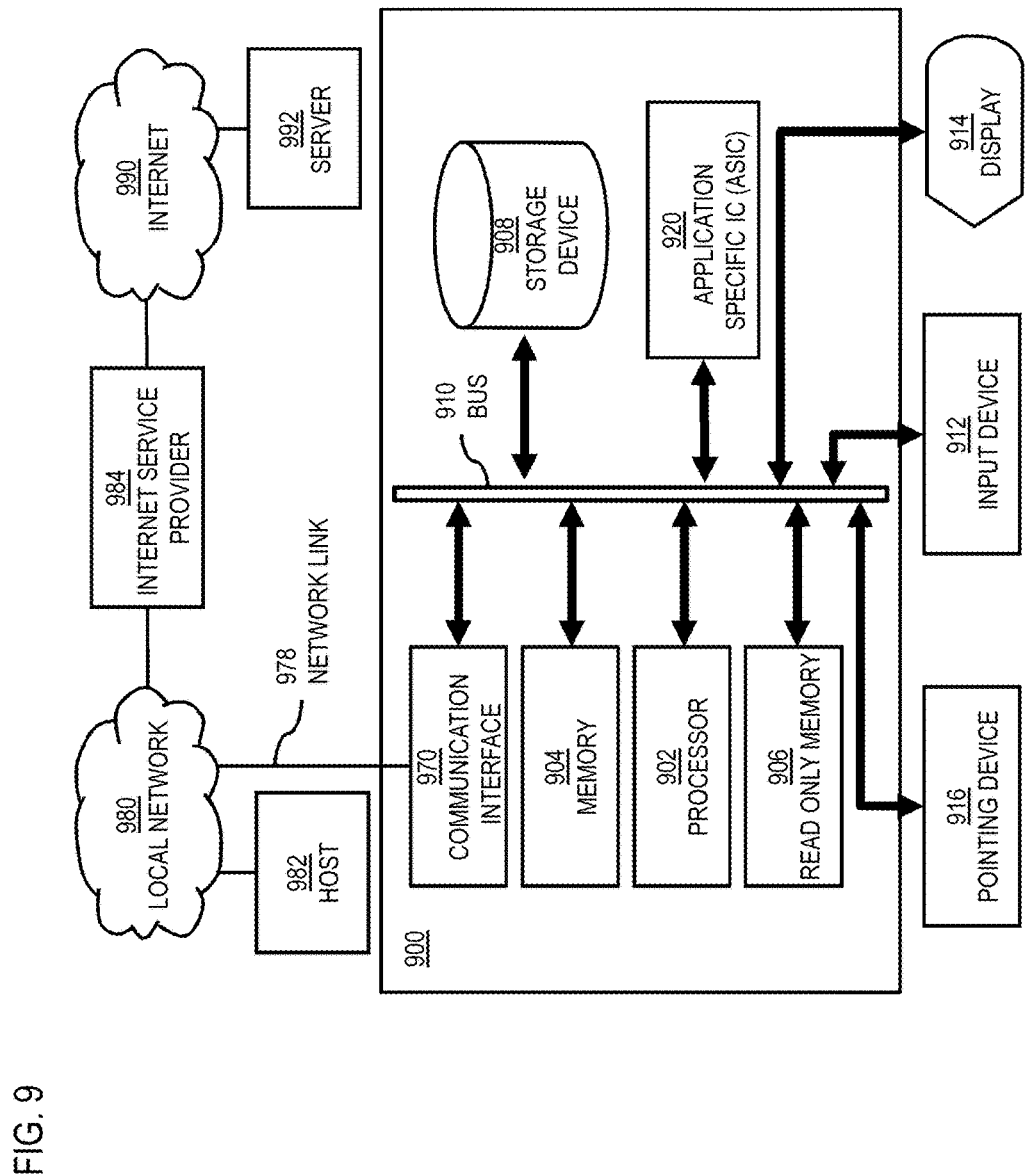
FIG. 9 is a diagram of hardware that can be used to implement an embodiment of the invention.

FIG. 9 illustrates a computer system 900 upon which an embodiment of the invention may be implemented. Computer system 900 is programmed (e.g., via computer program code or instructions) to provide a vertex-based evaluation of polygon similarity as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to providing a vertex-based evaluation of polygon similarity. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for providing a vertex-based evaluation of polygon similarity. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing a vertex-based evaluation of polygon similarity, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910.

Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 117 for providing a vertex-based evaluation of polygon similarity.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 10 illustrates a chip set 1000 upon which an embodiment of the invention may be implemented. Chip set 1000 is programmed to provide a vertex-based evaluation of polygon similarity as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide a vertex-based evaluation of polygon similarity. The memory 1005 also stores the data associated with or generated by the execution of the inventive steps.

Figure 11:
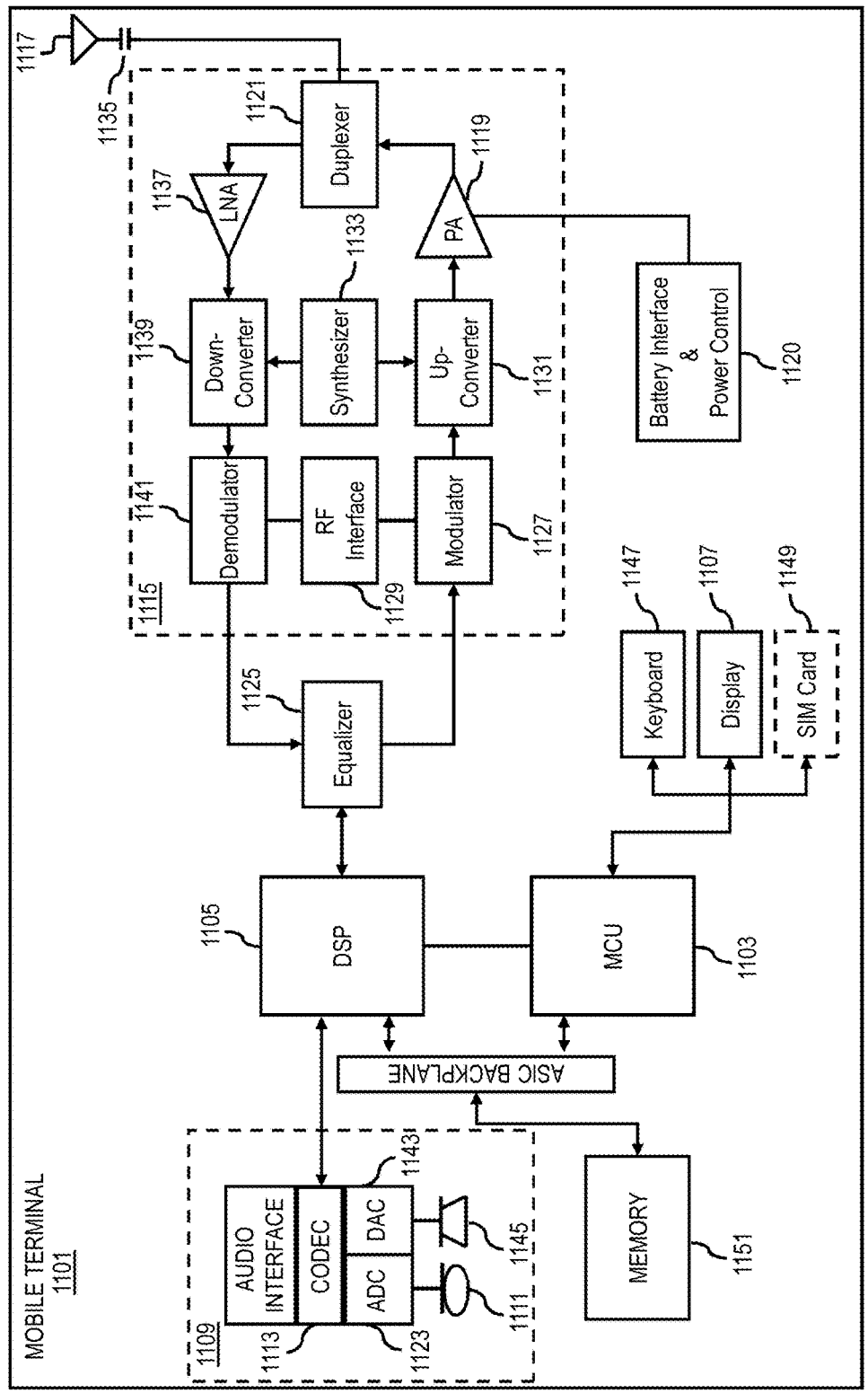
FIG. 11 is a diagram of a mobile terminal (e.g., handset) that can be used to implement an embodiment of the invention.

FIG. 11 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to provide a vertex-based evaluation of polygon similarity. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for evaluating polygon similarity using a computer vision system comprising:
    processing, by the computer vision system, an image to generate a first set of vertices of a first polygon representing an object depicted in the image;
    for each vertex in the first set of vertices, determining a closest vertex in a second set of vertices of a second polygon, and determining a distance between said each vertex in the first set of vertices and the closest vertex in the second set of vertices;
    calculating a polygon similarity of the first polygon with respect to the second polygon based on a total of the distance determined for said each vertex in the first set of vertices normalized to a number of vertices in the first set of vertices; and
    transmitting the polygon similarity over a network to a mapping platform,
    wherein the mapping platform processes the polygon similarity to localize a vehicle within a geographic area.

2. The method of claim 1,
    wherein the image was captured by a camera sensor of the vehicle.

3. The method of claim 1, further comprising:
for each vertex in the second set of vertices, determining a closest vertex in the first set of vertices, and determining another distance between said each vertex in the second set of vertices and the closest vertex in the first set of vertices; and
calculating a polygon similarity of the second polygon with respect to the first polygon based on another total of the another distance determined for said each vertex in the second set of vertices normalized to another number of vertices in the second set of vertices.

4. The method of claim 3, further comprising:
generating an asymmetric polygon similarity as a pair comprising the polygon similarity of the first polygon with respect to the second polygon and the polygon similarity of the second polygon with respect to the first polygon.

5. The method of claim 3, further comprising:
generating a symmetric polygon similarity by averaging the polygon similarity of the first polygon with respect to the second polygon and the polygon similarity of the second polygon with respect to the first polygon.

6. The method of claim 1, wherein the distance for said each vertex is based on a Euclidean distance, a city-block distance, a chessboard distance, or a combination thereof.

7. The method of claim 1, wherein the first polygon and the second polygon are N-dimensional polygons, and wherein N is greater than or equal to two.

8. An apparatus for evaluating polygon similarity using a computer vision system comprising:
at least one processor; and
at least one memory including computer program code for one or more programs,
the at least one memory and the computer program code configured to, within the at least one processor, cause the apparatus to perform at least the following,
process, by the computer vision system, an image to generate a first set of vertices of a first polygon representing an object depicted in the image;
for each vertex in the first set of vertices, determine a closest vertex in a second set of vertices of a second polygon, and determining a distance between said each vertex in the first set of vertices and the closest vertex in the second set of vertices;
calculate a polygon similarity of the first polygon with respect to the second polygon based on a total of the distance determined for said each vertex in the first set of vertices normalized to a number of vertices in the first set of vertices; and
transmit the polygon similarity over a network to a mapping platform,
wherein the mapping platform processes the polygon similarity to localize a vehicle within a geographic area.

9. The apparatus of claim 8,
wherein the image was captured by a camera sensor of the vehicle.

10. The apparatus of claim 8, wherein the apparatus is further caused to:
for each vertex in the second set of vertices, determine a closest vertex in the first set of vertices, and determining another distance between said each vertex in the second set of vertices and the closest vertex in the first set of vertices; and
calculate a polygon similarity of the second polygon with respect to the first polygon based on another total of the another distance determined for said each vertex in the second set of vertices normalized to another number of vertices in the second set of vertices.

11. The apparatus of claim 10, wherein the apparatus is further caused to:
generate an asymmetric polygon similarity as a pair comprising the polygon similarity of the first polygon with respect to the second polygon and the polygon similarity of the second polygon with respect to the first polygon.

12. The apparatus of claim 10, wherein the apparatus is further caused to:
generate a symmetric polygon similarity by averaging the polygon similarity of the first polygon with respect to the second polygon and the polygon similarity of the second polygon with respect to the first polygon.

13. The apparatus of claim 8, wherein the distance for said each vertex is based on a Euclidean distance, a city-block distance, a chessboard distance, or a combination thereof.

14. The apparatus of claim 8, wherein the first polygon and the second polygon are N-dimensional polygons, and wherein N is greater than or equal to two.

15. A non-transitory computer-readable storage medium for evaluating polygon similarity using a computer vision system, carrying one or more sequences of one or more instructions which, when executed by one or more processors, cause an apparatus to perform:
processing, by the computer vision system, an image to generate a first set of vertices of a first polygon representing an object depicted in the image;
for each vertex in the first set of vertices, determining a closest vertex in a second set of vertices of a second polygon, and determining a distance between said each vertex in the first set of vertices and the closest vertex in the second set of vertices;
calculating a polygon similarity of the first polygon with respect to the second polygon based on a total of the distance determined for said each vertex in the first set of vertices normalized to a number of vertices in the first set of vertices; and
transmitting the polygon similarity over a network to a mapping platform,
wherein the mapping platform processes the polygon similarity to localize a vehicle within a geographic area.

16. The storage medium of claim 15,
wherein the image was captured by a camera sensor of the vehicle.

17. The storage medium of claim 15, further comprising:
for each vertex in the second set of vertices, determining a closest vertex in the first set of vertices, and determining another distance between said each vertex in the second set of vertices and the closest vertex in the first set of vertices; and
calculating a polygon similarity of the second polygon with respect to the first polygon based on another total of the another distance determined for said each vertex in the second set of vertices normalized to another number of vertices in the second set of vertices.

18. The storage medium of claim 17, further comprising:
generating an asymmetric polygon similarity as a pair comprising the polygon similarity of the first polygon with respect to the second polygon and the polygon similarity of the second polygon with respect to the first polygon.

19. The storage medium of claim 17, further comprising:
generating a symmetric polygon similarity by averaging the polygon similarity of the first polygon with respect to the second polygon and the polygon similarity of the second polygon with respect to the first polygon.

20. The storage medium of claim 15, wherein the distance for said each vertex is based on a Euclidean distance, a city-block distance, a chessboard distance, or a combination thereof.

* * * * *